US008898013B2

United States Patent
Napolitano

(10) Patent No.: US 8,898,013 B2
(45) Date of Patent: Nov. 25, 2014

(54) NAVIGATION DEVICE AND PROCESS INTEGRATING SEVERAL HYBRID INERTIAL NAVIGATION SYSTEMS

(75) Inventor: Fabien Napolitano, Mareil-Marly (FR)

(73) Assignee: Ixblue, Marly-le-Roi (FR)

(*) Notice: Subject to any disclaimer, the term of this patent is extended or adjusted under 35 U.S.C. 154(b) by 49 days.

(21) Appl. No.: 13/534,760

(22) Filed: Jun. 27, 2012

(65) Prior Publication Data
US 2013/0006528 A1 Jan. 3, 2013

(30) Foreign Application Priority Data
Jun. 29, 2011 (FR) .................................. 11 55834

(51) Int. Cl.
*G01C 21/10* (2006.01)
*G01C 21/16* (2006.01)
(52) U.S. Cl.
CPC .................................. *G01C 21/165* (2013.01)
USPC ........... 701/505; 701/500; 701/502; 701/506; 701/509
(58) Field of Classification Search
CPC .... G01C 21/165; G01C 21/206; G01C 21/00; G01C 21/28; G01C 21/26; G01S 5/0263; G01S 1/24; G01S 19/47; G01S 19/10; G01S 19/18; B06W 2510/244; B06W 20/00; B06W 10/08; B06W 2540/16; B06W 10/11
USPC .............. 701/207, 213, 220, 472, 41, 7, 216, 701/468, 501, 1, 113, 36, 409, 411; 342/357.12, 357.03, 357.14, 357.44, 342/386, 464, 357.28, 357.3, 357.31, 342/357.34; 700/280; 370/210; 455/133, 455/277.1, 280, 436, 444, 449, 560, 562.1
See application file for complete search history.

(56) References Cited

U.S. PATENT DOCUMENTS

| | | | | |
|---|---|---|---|---|
| 5,386,372 A | * | 1/1995 | Kobayashi et al. | ........... 700/280 |
| 5,719,764 A | | 2/1998 | McClary | |
| 7,219,013 B1 | * | 5/2007 | Young et al. | ................... 701/472 |
| 7,970,500 B2 | * | 6/2011 | Parra Carque | .................... 701/7 |
| 2002/0126044 A1 | * | 9/2002 | Gustafson et al. | ........ 342/357.12 |
| 2003/0114980 A1 | * | 6/2003 | Klausner et al. | ............... 701/207 |
| 2003/0130791 A1 | * | 7/2003 | McIntyre | ....................... 701/213 |
| 2004/0064252 A1 | * | 4/2004 | Kirkland et al. | ............... 701/220 |
| 2005/0125104 A1 | * | 6/2005 | Wilson et al. | .................. 700/295 |
| 2006/0167619 A1 | | 7/2006 | Arethens | |
| 2008/0025200 A1 | * | 1/2008 | Tiirola et al. | .................. 370/210 |
| 2008/0037614 A1 | * | 2/2008 | Douglas | ......................... 375/150 |
| 2009/0121927 A1 | * | 5/2009 | Moshfeghi | ............... 342/357.03 |
| 2010/0046589 A1 | * | 2/2010 | Douglas | ......................... 375/150 |
| 2010/0109949 A1 | * | 5/2010 | Garmonov et al. | ....... 342/357.14 |

(Continued)

*Primary Examiner* — Calvin Cheung
*Assistant Examiner* — Luis A Martinez Borrero
(74) *Attorney, Agent, or Firm* — Young & Thompson

(57) ABSTRACT

A hybrid navigation device includes at least one auxiliary sensor adapted to deliver at least one auxiliary signal and a plurality of hybrid navigation systems, each including at least one inertial navigation system and one calculator configured to form an hybrid signal at the output of each hybrid navigation system. The hybrid navigation device includes a module for the detection of good operating condition and the weighting of the hybrid navigation systems, the module being configured to receive the at least one auxiliary signal, and the hybrid signals of each hybrid navigation system, respectively, to deduce therefrom an indicator of good operating condition and a weighting coefficient for each hybrid navigation system, and to calculate a weighted hybrid signal as a function of the hybrid signals and of the weighting coefficients of each hybrid navigation system, respectively.

12 Claims, 1 Drawing Sheet

(56) References Cited

U.S. PATENT DOCUMENTS

Figure 1:
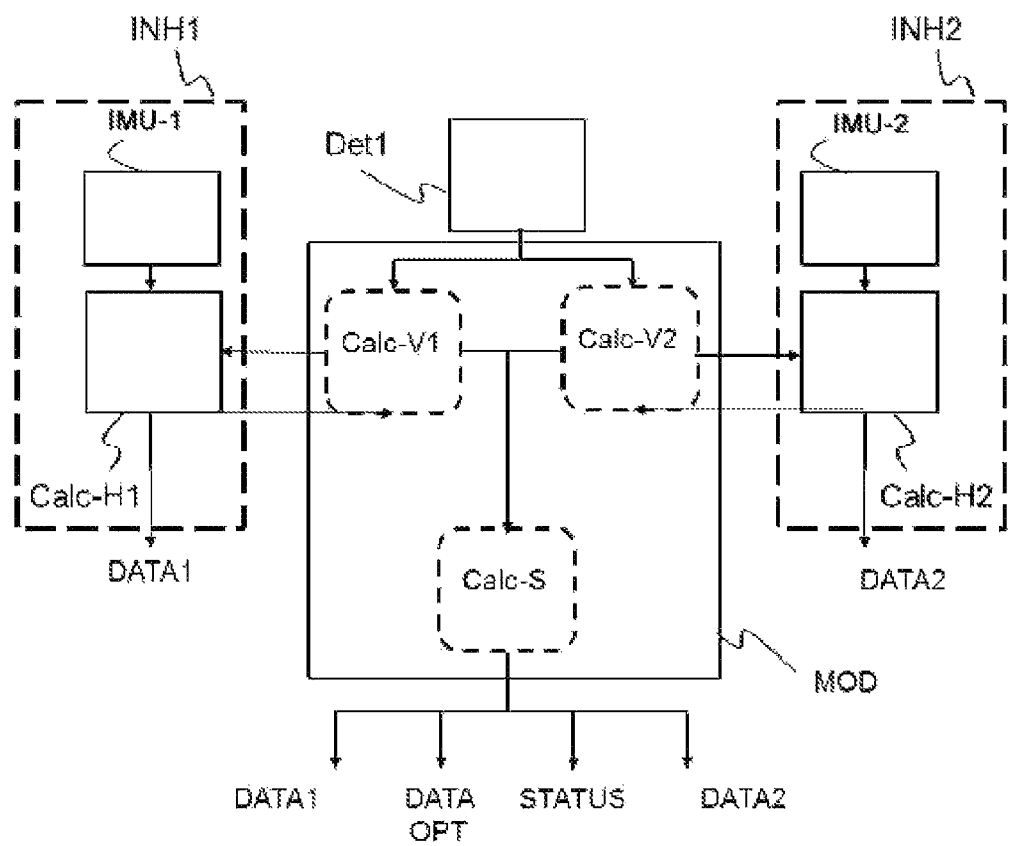

| | | |
|---|---|---|
| 2010/0161179 A1* | 6/2010 | McClure et al. ................. 701/41 |
| 2010/0225536 A1* | 9/2010 | Kobori et al. ............ 342/357.44 |
| 2010/0271087 A1* | 10/2010 | Choi ............................ 327/149 |
| 2010/0283626 A1* | 11/2010 | Breed ...................... 340/825.49 |
| 2010/0332135 A1* | 12/2010 | Toda ............................ 701/216 |
| 2011/0040430 A1 | 2/2011 | Tessier |
| 2012/0004846 A1 | 1/2012 | Coatantiec et al. |

\* cited by examiner

NAVIGATION DEVICE AND PROCESS INTEGRATING SEVERAL HYBRID INERTIAL NAVIGATION SYSTEMS

The invention relates to the navigation systems for planes, ships or other vehicles, and in particular to the case where several hybrid inertial navigation systems are used on a same vehicle.

As used herein, "hybrid navigation system" means a system that comprises at least one inertial measuring unit and at least one auxiliary sensor, wherein a calculator hybridizes the measurements coming from the inertial measuring unit with the measurements coming from the auxiliary sensor. In a hybrid navigation system, hybridization of the inertial measuring unit and the auxiliary sensor measurements makes it possible to achieve performance higher than those of each of the sub-systems and to perform estimates of parameters that are inaccessible when considering each of the measuring sub-system in isolation.

For example, in a hybrid navigation system, the use of an auxiliary position sensor makes it possible to obtain accuracies of heading estimates that could not be reached if considering each of the measuring sub-system in isolation. In particular, in a hybrid navigation system for a marine application, the use of an auxiliary sensor providing the speed with respect to the current makes it possible to obtain an estimate of said current, which would be impossible if considering each of the sub-system in isolation.

The use of hybrid inertial navigation systems has become widespread in many applications since the end of the 90's, thanks to the development of efficient on-board calculation systems, the generalization of satellite navigation systems or other navigation assistance systems, and the cost reduction of the gyroscope and accelerometer inertial components. Such navigation systems are today present on a very large number of platforms, such as planes, ships, submarines, or terrestrial vehicles . . . .

In a large number of cases, several hybrid navigation systems are present on the same platform. The presence of multiple systems makes it possible, in case a failure of one of the systems is detected, to continue navigating using the other system(s). The presence of multiple systems also makes it possible to calculate, by combining the output information of the different systems, information more accurate than that coming from each of the sub-systems. Such configuration with multiple hybrid systems on the same platform thus tends to become widespread to respond to the constraints of navigation security and performance and thus of integrity of the vehicle.

The method of anomaly detection in such configurations is generally based on one of the three following types of methods or on a combination of a sub-set of these methods:
- a procedure called "majority vote" is applicable to a device comprising at least three inertial systems on a same platform;
- a checking of the individual status of each system independently from each other; and/or
- an error covariance estimate provided by each of the systems.

The procedures of the "majority vote" type make it possible to detect which hybrid inertial system is operating the least well among at least three comparable hybrid inertial systems. However, the "majority vote" method does not work in the case where only two hybrid inertial systems have to be compared. On the other hand, the "majority vote" method is badly adapted to the cases where systems with different classes of performance have to be compared. Moreover, in the case where a majority of hybrid inertial systems have a same failure, the "majority vote" may lead to navigation errors.

The methods based on the individual statuses make it possible to detect the clear failures but do not make it possible to determine which hybrid inertial system is operating the best among several hybrid inertial systems without clear failure.

Finally, the methods based on the information of the "error covariance" type do not make it possible to detect operating anomalies but only to compare the performance of several systems, provided that each of them works nominally. In particular, when two systems with the same characteristics are used on the same vehicle, they provide the same error covariance information, even if, in practice, one of the two systems may have a significantly smaller error than the other.

Therefore, a need exists for a new method making it possible to determine which hybrid inertial system is operating the best among a plurality of hybrid inertial systems. In particular, in the case of two hybrid inertial systems, it is desirable to be able to determine which system is operating the best, with the least error. Especially, in the case of several inertial systems of different classes of performance, it is desirable to be able to determine which system is operating the best with the least error.

In the last years, new filtering methods have been developed, which are based in particular on the use of a likelihood evaluation within the statistical significance. Such filtering methods make it possible to obtain indicators of good operating condition of a system made up of two sensors providing comparable information.

Accordingly, the document US2011/0040430 A1 describes a system comprising several Inertial Measuring Units (IMU), one or several auxiliary sensors and one anomaly detection unit. The anomaly detection unit compares the IMU data and the auxiliary data as a function of a likelihood-based criterion, which makes it possible to detect operating anomalies of the IMUS or of the elementary sensors thereof (gyroscope and accelerometer).

On the other hand, the document US2010/0049439 A1 describes a hybrid navigation system comprising a single IMU and a single external sensor (GPS). The hybrid navigation system comprises two different hybridization filters, arranged in parallel, and a calculator compares the different hybridizations of the IMU-auxiliary sensor couple in accordance to a likelihood criterion. This device makes it possible to select the best hybridization filter and to detect operating anomalies of the other hybridization filter.

Finally, the document US2010/0256906 A1 describes a hybrid navigation system comprising a single IMU, one or several auxiliary sensors and a bank of multi-hypothesis filters. This device makes it possible to compare the different filters in accordance to a likelihood criterion and to detect operating anomalies of one of the filters.

However, these devices are not applicable to the relatively common case of multiple hybrid navigation systems based on independent IMUS. Indeed, the devices of US2010/0256906 A1 and US2010/0049439 A1 are only applicable to the case of a single IMU. Moreover, the device of US2011/0040430 A1 needs an access to the IMU data before hybridization and thus imposes that the hybridization is performed downstream. The method described in the document US2011/0040430 A1 is thus not applicable to the existing hybrid systems that are common on the market and in which the hybridization function is already wired.

Therefore, a need exists for an anomaly detection system capable of comparing the operation of several hybrid navigation systems without needing to recast the hybridization calculations and capable of detecting fine operating anomalies, including when only two hybrid inertial systems are used on the same vehicle and a procedure of the "majority vote" is not possible.

In many cases, the navigation system of the vehicle that is desired to be positioned does not include auxiliary sensors, whose output information is directly comparable to the information that would be issued from one or several inertial measuring units considered in isolation.

For example, in the marine applications and in case of temporary or systematic absence of a GPS signal, the only auxiliary data available is often limited to a speed data relating to the water layer in which the ship navigates. This data being the sum of the real speed and of the speed of the sea current, it cannot be compared pertinently to the data issued from an inertial measuring unit considered in isolation.

The present systems, and in particular the device of US2011/0040430, do not make it possible to respond to this set of problems, because they need that the data of the auxiliary sensor correspond to a sub-set of the data issued from the inertial measuring units.

Therefore, a need exists for an anomaly detection system capable of comparing the operation of several navigation systems using the data of an auxiliary sensor, whose output information is not directly comparable to the information issued from one unit or from several inertial measuring units considered in isolation.

One object of the invention is to determine the best hybrid navigation system among a plurality of hybrid navigation systems on board the same vehicle.

One object of the invention is to determine the best navigation system among a plurality of navigation systems on board the same vehicle, in the case where the output information of the auxiliary sensor(s) present on the vehicle does not make possible a direct comparison with the data issued from the inertial measuring units.

Besides, in the case where several navigation systems are present on the same vehicle, it is desired to combine the information from these different systems in order to deduce therefrom information more accurate than that of each of the sub-systems. The two most generally used methods in this case are:
- a barycentre calculation relating to the information of the two systems based on barycentre coefficients fixed a priori, or
- a barycentre calculation relating to the information of the two systems based on barycentre coefficients issued from the error covariant information of each of these systems.

In practice, neither of these barycentre method makes it possible to take into account the real behaviour of each of the systems during a navigation and they tend, on the one hand, to calculate under-optimum data and, on the other hand, to overestimate the quality of the data obtained by combining the data of each of the sub-systems. For example, in the case where two systems with the same characteristics are used on a vehicle, each of these systems provides over time the same error covariance information. The use of the error covariance information as a coefficient for an averaging procedure amounts, in this case, to calculating the average of the outputs of the two systems, with a fixed barycentre coefficient equal to one half for each of the systems. The calculated covariance of the combined information is then equal to the common covariance of the two sub-systems divided by two. Although this processing is theoretically optimum, it is generally far under optimum in a real situation. Indeed, in a real situation, let's suppose that one of the two systems works less well than the other. This dysfunction is not detected from the output covariance information, so that the system that works the least well is affected with the same coefficient than the system that works the best. The information obtained by combination is then under-optimal whereas the error estimates of the combination are too optimistic. It is well shown by an extreme example where the information of one of the systems is absolutely false whereas the other system works nominally. In this case, the optimum combination consists in considering only the system that works nominally, the other system being affected with a barycentre coefficient equal to zero, and the covariance of this "combination" is of course the covariance of this sub-system and not this covariance divided by two, as calculated by the common methods.

Therefore, a need exists for a system capable of combining the information of two navigation systems while taking into account the real behaviour thereof during the navigation, in order to deduce therefrom realistic and close-to-optimum navigation and navigation error information.

The present invention aims to remedy the drawbacks of the prior arts and more particularly relates to a hybrid navigation device for a vehicle comprising at least one auxiliary sensor adapted to deliver at least one auxiliary signal representative of an auxiliary navigation parameter of the vehicle, and a plurality of hybrid navigation systems, each hybrid navigation system comprising at least one inertial navigation system comprising at least one inertial measuring unit, said inertial measuring unit being adapted to deliver at least one signal representative of an inertial measurement, and each hybrid navigation system comprising at least one calculator configured in such a manner to hybridize said at least one signal representative of an inertial measurement with said at least one auxiliary signal, to form a hybrid signal at the output of each hybrid navigation system.

According to the invention, said hybrid navigation device comprises a module for the detection of good operating condition and the weighting of said hybrid navigation systems, said module being configured in such a manner to receive, on the one hand, said at least one auxiliary signal, and on the other hand, said hybrid signals at the output of each hybrid navigation system, respectively, and to deduce therefrom at least one indicator of good operating condition and a weighting coefficient for each hybrid navigation system, said weighting coefficient being respectively calculated as a function of a likelihood of the residue between said hybrid signal and said auxiliary signal, and said module being configured in such a manner to calculate a weighted hybrid signal as a function of said hybrid signals and of the weighting coefficients of each hybrid navigation system, respectively.

According to a preferred embodiment, the good-operating-condition detection and weighting module comprises, for each hybrid navigation system, a calculation block configured to calculate a residue between said hybrid signal and said auxiliary signal and to calculate a weighting coefficient of said hybrid signal as a function of the likelihood of said residue or as a function the log-likelihood of said residue.

According to a particular embodiment, the hybrid navigation device comprises a plurality of hybrid inertial systems and a plurality of auxiliary sensors, wherein each inertial system is hybridized with a different auxiliary sensor.

According to a particular embodiment, the hybrid navigation device comprises a plurality of hybrid inertial systems and a plurality of auxiliary sensors, wherein at least one hybrid inertial system is hybridized with several auxiliary sensors, and wherein the associated calculation block is configured in such a manner to calculate a whole likelihood of a set of sensors and/or a partial likelihood relating to a sub-set of sensors from the set of sensors hybridized to the hybrid inertial system.

According to various particular aspects of the invention:

each calculator is configured in such a manner to calculate and to transmit to the detection module, on the one hand, the navigation states of said hybrid navigation system, and on the other hand, an error estimator for said navigation states;

the error estimator for the navigation states comprises the covariance matrix of the navigation states or a part of the covariance matrix of the navigation states;

the device comprises two hybrid inertial systems and the weighted hybrid signal is calculated as a function of said hybrid signals and of the respective weighting coefficients of each hybrid navigation system, according to the following formula:

$$DATAOPT = \frac{\Lambda_{DATA1}DATA1 + \Lambda_{DATA2}DATA2}{\Lambda_{DATA1} + \Lambda_{DATA2}}$$

where the weighting coefficients $\Lambda_{DATA1}$ and $\Lambda_{DATA2}$ are respectively calculated as a function of the likelihood of the residue between said auxiliary signal and said hybrid signal relating to each hybrid inertial system;

the error covariance SOPT of the weighted hybrid signal DATAOPT is obtained by the following formula:

$$SOPT = \frac{(\Lambda_{DATA1})^2 SDATA1 + (\Lambda_{DATA2})^2 SDATA2}{(\Lambda_{DATA1} + \Lambda_{DATA2})^2}$$

said calculation blocks are integrated in the calculator(s) of one or a plurality of hybrid inertial systems.

The present invention also relates to a method of navigation for a vehicle, based on the use of a device according to one of the described embodiments and comprising the following steps:

acquiring by at least one auxiliary sensor at least one auxiliary signal representative of a navigation parameter of the vehicle, and acquiring a plurality of signals representative, respectively, of an inertial measurement, by means of a plurality of navigation systems, calculating a hybrid signal at the output of each hybrid navigation system based on at least one auxiliary signal and a signal representative of an inertial measurement, calculating an indicator of good operating condition and a weighting coefficient for each hybrid navigation system as a function, on the one hand, of the at least one auxiliary signal, and on the other hand, of the hybrid signals at the output of each hybrid navigation system, respectively, and calculating a weighted hybrid signal as a function of said hybrid signals and of the weighting coefficients of each hybrid navigation system, respectively.

According to a preferred embodiment, the method of navigation further comprises the following steps:

calculating a residue between said hybrid signal and said auxiliary signal, and calculating a respective weighting coefficient of said hybrid signal based on the likelihood of said residue.

The invention will find a particularly advantageous application in the devices integrating a plurality of hybrid inertial navigation systems.

The present invention also relates to the characteristics that will become evident from the following description and that will have to be considered either alone or in any technically possible combination thereof.

Figure 2:
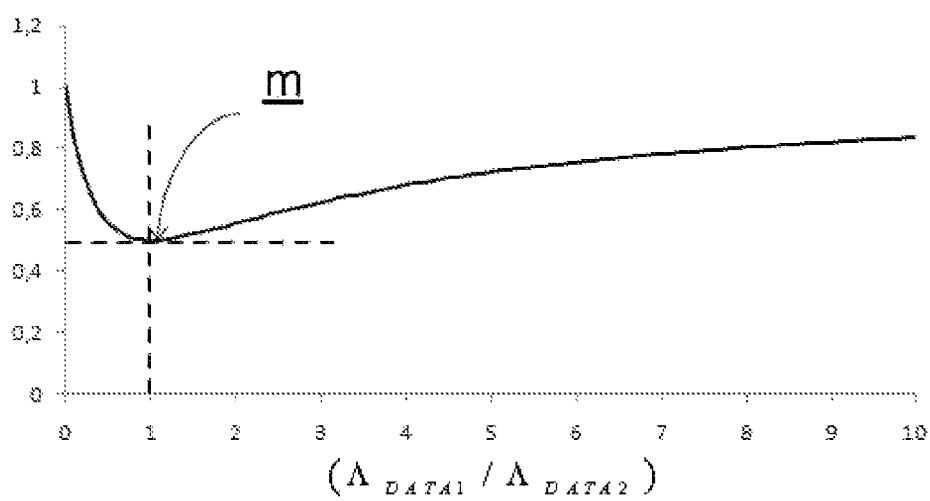

Such description, given by way of non-limitative example, will permit to better is understand how the invention can be implemented with reference to the appended drawings, in which:

FIG. 1 schematically shows a device according to an embodiment of the system of the invention, in the case of two navigation systems hybridized with an auxiliary sensor;

FIG. 2 shows the covariance improvement coefficient calculated as a function of the likelihood ratio of the two sub-systems ($\Lambda_{DATA1}/\Lambda_{DATA2}$) in the case of two sub-systems with identical characteristics.

In a first part, the conventional working of such systems will be rapidly described. In a second part, a method of likelihood estimate will be explained. Finally, the implementation of these principles in a device for the detection of good operating condition and the weighting of hybrid inertial navigation systems will be described.

A. Hybrid Inertial Navigation Systems

The general working of the hybrid inertial navigation systems follows the conventional principles well described in the literature (see for example PHINS: the first high performance inertial navigation system based on fiber optic gyroscopes, F. Napolitano, T. Gaiffe, Y. Cottreau, T. Loret, Proceedings St Petersbourg International Conference on Navigation Systems 2002).

Within an inertial navigation system is found an inertial measuring unit generally made up of at least three gyroscopes and three accelerometers (possibly more in redundant configurations). The gyroscopes and the accelerometers provide at high rate (typically 200 Hz) the information of instantaneous rotation and acceleration of the system. Such information is integrated within a calculator that possibly carries out a compensation of the raw data of the sensors following a model pre-calibrated in factory (for example, a temperature dependence model). After the compensation, the compensated measurements are then integrated following the conventional equation of the dynamics, which makes it possible, from initial position and orientation, to maintain over time updated position and orientation.

Given that the gyroscope and accelerometer sensors are in practice imperfect (typically the data they provide are marred by noise, bias error and scaling factor), the integration of those errors leads over time to accumulations of significant errors on the updated position and orientation.

The position and orientation data are thus generally led to be hybridized with the data issued by other types of sensors providing comparable information. Such auxiliary sensors are, for example, satellite radio navigation systems (GPS, GLONASS, . . . ), speed sensors (Doppler log, electromagnetic log, . . . ), altimeter sensors combined with a pre-recorded cartography (radar altimetry, bathymetric sounding, . . . ).

The hybridization is conventionally carried out using a Kalman filter, but it can be carried out using any optimum fusion method (for example, the numerous filters derived from the Kalman filter: unscented, extended Kalman filter, . . . , particle filter, . . . ).

The general principle of this hybridization is the following. Over time, in parallel with integrating the movement equations, the calculator maintains an estimate of the system errors. This estimate of the system errors is based in particular on a model of the errors of the elementary sensors of the IMU and of the assemblage thereof. At each reception of an auxiliary sensor information, the information of this sensor is compared with the calculation of the navigation system. The residue, i.e. the difference, observed between the prediction of the navigation system and the sensor information is then combined, on the one hand, to the estimate of the navigation system errors, and on the other hand, to a model of error of the auxiliary sensor information. The calculator deduces therefrom a correction of the inertial navigation system as well as the uncertainty thereof. The calculation of the system states (position, speed, orientation) is then continued in a recursive manner until the next information of an auxiliary sensor, which in turn serves to correct the state and error estimates of the navigation system. Preferably, the error estimates of the navigation system are shown by the matrix of estimated covariance of these errors.

Generally, a hybrid navigation system thus provides, on the one hand, an estimate of the system states (position, speed, orientation), but also an estimate of the error covariance of these states. In certain particular cases, the system also provides estimates of other parameters that are not directly states of navigation (as well as the errors thereof). For example, these particular parameters can be linked to the errors affecting the auxiliary sensors (for example, the sea current in the case of an electromagnetic log for the marine applications).

B. Likelihood Estimate

The likelihood estimate of an observation is based on the conventional statistical methods.

Let's suppose that a variable v is observed, whose probability law N is known. By is definition, the likelihood ve of an observation will be given by the value N(ve).

For example, if the probability low is a multidimensional normal law of variance S, the likelihood of the observation r is given by the formula:

$$\Lambda = \frac{1}{\sqrt{2\pi|S|}} \exp\left(-\frac{1}{2} r^t S^{-1} r\right)$$

This type of calculation is applied in the case where a hybrid navigation system, on the one hand, and an auxiliary sensor, on the other hand, are considered. In this case, it is generally supposed that the different variables are Gaussian variables and the variance estimate P of the hybrid navigation system data, before the fusion with the auxiliary sensor data, and on the other hand, the variance estimate R of the auxiliary sensor data, are available.

Let's note x the state of the hybrid navigation system, z the data of the auxiliary sensor and H the measurement matrix (a matrix connecting the system state to the auxiliary sensor data), and r the residue, defined by the equation:

$$r = z - Hx$$

It can then be checked that the residue r has a Gaussian probability distribution, whose variance is given by:

$$S = HPH^t + R$$

As can be seen in this formula, the calculation of the variance of the observation is based in particular on the error estimate of the navigation system. A calculation of likelihood based on this variance thus naturally takes into account the class of performance of the system considered, which makes it possible to use this type of estimator, whatever the classes of performance of the systems that are considered.

It is then possible to calculate, from the preceding formulas, the likelihood of the observation performed by confronting the data of the hybrid navigation system with that(those) of the auxiliary sensor. An important point to be noted is that this statistical likelihood calculation has to be made before the hybridization of the IMU and the auxiliary sensor is carried out.

In many cases, one is not satisfied with a likelihood estimate based on only one updating and one is thus led to calculate the log-likelihood corresponding to several successive receptions of data from the auxiliary sensor(s).

The likelihood estimate (or log-likelihood) then provides an indicator of good operating condition of the system considered.

C. Implementation of a System for the Detection of Good Operating Condition and the Weighting of Hybrid Inertial Navigation Systems Based on the likelihood estimation method described above, a system for the detection of good operating condition and the weighting of hybrid inertial navigation systems according to a particular embodiment will now be described, in connexion with FIG. 1.

FIG. 1 schematically shows an inertial navigation device comprising an auxiliary sensor Det1 and two hybrid navigation systems INH1 and INH2. The device further comprises a calculation module MOD connected, on the one hand, to the auxiliary sensor Det1, and on the other hand, to the two hybrid systems INH1 and INH2.

Each hybrid navigation system INH1, respectively INH2, comprises an inertial measurement unit, IMU-1, respectively IMU-2, and a calculator Calc-H1, respectively Calc-H2. The calculator Calc-H1 receives, on the one hand, the measurements of the auxiliary sensor Det1, and on the other hand, the measurements of the IMU-1, and carries out a calculation of hybridization between the measurements of the IMU-1 and of the auxiliary sensor Det1. In a similar way, the calculator Calc-H2 receives, on the one hand, the measurements of the auxiliary sensor Det1, and on the other hand, the measurements of the IMU-2, and carries out a calculation of hybridization between the measurements of the IMU-2 and of the auxiliary sensor Det1.

The module MOD receives, at a high rate, the information DATA1 and DATA2 calculated by each of the hybrid systems INH1 and INH2, and in particular, the estimates of position, speed, orientation of the vehicle, as well as the estimates of the uncertainties SDATA1 and SDATA2 (for example, in the form of a covariance matrix).

This module MOD also receives the information of the auxiliary sensor Det1 before the transmission thereof to the hybrid navigation systems INH1 and INH2.

At each reception of information from the auxiliary sensor, the module MOD carries out, in a calculation block, Calc-v1 and Calc-v2, respectively, a likelihood calculation, as described hereinabove for each of the hybrid systems INH1 and INH2. It is to be noted that, to carry out this calculation, knowledge of the internal working of the hybrid systems or of the characteristics of their gyroscope and accelerometer sensors IMU-1 and IMU-2 is not required. This likelihood calculation can thus be carried out independently of the knowledge of the inertial navigation systems INH1 and INH2 and is naturally compatible with any type of hybrid navigation system, without modification.

The module MOD outputs, at the same rate than the information of the hybrid navigation systems (in the exemplary embodiment considered), four types of data: the data DATA1 and DATA2 of each of the hybrid systems, data DATAOPT obtained by weighting the data of each of the hybrid systems and data SOPT of error covariance estimate for the data DATAOPT.

Typically, the calculation of DATAOPT is carried out in accordance to the following formula:

$$DATAOPT = \frac{\Lambda_{DATA1} DATA1 + \Lambda_{DATA2} DATA2}{\Lambda_{DATA1} + \Lambda_{DATA2}},$$

where $\Lambda_{DATA1}$ and $\Lambda_{DATA2}$ are the calculated likelihoods of the data DATA1 and DATA2 (these coefficients being always strictly positive).

Typically, the calculation of SOPT is carried out in accordance to the following formula:

$$SOPT = \frac{(\Lambda_{DATA1})^2 SDATA1 + (\Lambda_{DATA2})^2 SDATA2}{(\Lambda_{DATA1} + \Lambda_{DATA2})^2},$$

where $\Lambda_{DATA1}$ and $\Lambda_{DATA2}$ are the calculated likelihoods of the data DATA1 and DATA2 (these coefficients being always strictly positive).

The module MOD also outputs information STATUS about the operation or anomaly statuses of each of the hybrid navigation systems. These statuses may be, for example, the weighting coefficients given hereinabove or functions of these weighting coefficients (wherein, for example, the result of a thresholding on these coefficients make it possible to give a binary indicator of good operating condition).

This description shows an embodiment of the invention, but many embodiments and variants are possible.

According to another embodiment, the device comprises several different auxiliary sensors and the good-operating-condition detection and weighting module calculates either a likelihood corresponding to the set of auxiliary sensors, or a likelihood corresponding to a sub-set of the auxiliary sensors.

According to a variant of a device comprising several different auxiliary sensors, only a part of these auxiliary sensors is used to be hybridized to certain inertial navigation systems and other different sensors are used to be hybridized to other hybrid systems (for example, in the case where two auxiliary sensors GPS1 and GPS2 are used, wherein the GPS1 is hybridized to only a first inertial system INS1 and the GPS2 is hybridized to only a second inertial system 2).

According to another embodiment, the device comprises more than two hybrid navigation systems, and at least one likelihood calculation block Calc-Vi is associated with each hybrid navigation system INHi.

According to a particular embodiment, the module MOD outputs only relative likelihood information of one of the systems with respect to the other, i.e. the ratio of the corresponding likelihoods.

According to a particular embodiment, the calculator of the module MOD uses error estimators for the hybrid systems, represented as a different form of the covariance matrix, for example an error estimator based only on the diagonal part of the covariance matrix.

According to a particular embodiment, the device comprises a plurality of available calculators, the calculations being distributed over a more or less important number of calculators. Advantageously, the likelihood calculations are partially or totally integrated in the calculators of one or several hybrid navigation systems, provided these calculators are accessible.

In the case of two systems with identical characteristics, FIG. 2 shows the covariance improvement coefficient (Cov.) calculated as a function of the likelihood ratio of the two systems ($\Lambda_{DATA1}/\Lambda_{DATA2}$). As can be seen in FIG. 2, there is again the conventional coefficient equal to one half in the case where the two systems have the same likelihood, which corresponds to a conventional average m. In all the other cases, it is observed that the improvement coefficient is closer than one, which shows that the conventional processing tends to overestimate the performance of the combined information.

The invention makes it possible to compare the good operating condition of several hybrid navigation systems.

The device and the method of the invention make it possible to use several hybrid inertial navigation systems in a same vehicle, while providing a weighting coefficient for each hybrid inertial navigation system. Moreover, the invention makes it possible to detect the good operating condition of each of the hybrid inertial navigation systems used. The invention provides a combined data DATAOPT based on the estimates of good operating condition of each of the hybrid inertial navigation systems. Moreover, the invention provides an error estimate SOPT of this combined data DATAOPT.

The device and the method of the invention make it possible to use navigation systems with different classes of performance.

The device and the method of the invention make it possible to obtain estimates of the navigation states that are more accurate than those obtained by the conventional methods.

The device and the method of the invention make it possible to obtain an estimate of the navigation state error that is more realistic and less optimistic than the conventional methods.

The device and the method of the invention make it possible to use one or several auxiliary sensor(s) to evaluate the good operating condition of each of the hybrid navigation systems. In particular, auxiliary sensors can be used, whose data are not directly comparable with the navigation states of the vehicle and in particular not directly comparable with the data issued from inertial measuring units considered independently from each other.

The device of the invention is compatible with the already existing hybrid navigation systems, to which it is just necessary to add an additional calculation module, arranged between each hybrid inertial system and the associated auxiliary sensor(s).

The invention claimed is:

1. A hybrid navigation device for a vehicle, comprising:
at least one auxiliary sensor (DET1) adapted to deliver at least one auxiliary signal representative of an auxiliary navigation parameter of the vehicle, and
a plurality of hybrid navigation systems (INH1, INH2), each hybrid navigation system comprising at least one inertial navigation system comprising at least one inertial measuring unit (IMU-1, IMU-2) including three gyroscopes and three accelerometers and, said inertial measuring unit (IMU-1, IMU-2) being adapted to deliver corresponding instantaneous rotation and acceleration signals representative of inertial measurements respectively made by the three gyroscopes and the three accelerometers, and each hybrid navigation system comprising at least one calculator (CALC-H1, CALC-H2) configured in such a manner to hybridize at least one of said signals representative of inertial measurements with said at least one auxiliary signal, to form a hybrid signal at the output of each hybrid navigation system (DATA1, DATA2),
characterized in that:
said hybrid navigation device comprises a module (MOD) for the weighting of said hybrid navigation systems (INH1, INH2), said module (MOD) being configured in such a manner to receive, said at least one auxiliary signal and said hybrid signals (DATA1, DATA2) at the output of each hybrid navigation system (INH1, INH2), respectively, to calculate, for each hybrid navigation system, a likelihood of a residue between said hybrid signal output from the concerned hybrid navigation system and said auxiliary signal using a variance estimate of said hybrid signal and a variance estimate of the auxiliary signal, and to deduce therefrom a weighting coefficient for each hybrid navigation system (INH1, INH2), said weighting coefficient being respectively calculated as a function of the likelihood of the residue between said hybrid signal (DATA1, DATA2) and said auxiliary signal, and said module (MOD) being configured in such a manner to calculate a weighted hybrid signal (DATAOPT) as a function of said hybrid signals (DATA1, DATA2) and of the weighting coefficients of each hybrid navigation system, respectively.

2. The hybrid navigation device for a vehicle according to claim 1, comprising a plurality of hybrid inertial systems (INH1, INH2) and a plurality of auxiliary sensors, wherein each inertial system is hybridized with a different auxiliary sensor.

3. The hybrid navigation device for a vehicle according to claim 1, comprising a plurality of hybrid inertial systems (INH1, INH2) and a plurality of auxiliary sensors, wherein at least one hybrid inertial system (INH1, INH2) is hybridized with several auxiliary sensors, and wherein the associated calculation block (Calc-V1, Calc-V2) is configured in such a manner to calculate a whole likelihood of a set of sensors and/or a partial likelihood relating to a sub-set of sensors from the set of sensors hybridized to the hybrid inertial system.

4. The hybrid navigation device for a vehicle according to claim 1, wherein each calculator (CALC-H1, CALC-H2) is configured in such a manner to calculate and to transmit to the detection module (MOD the navigation states of said hybrid navigation system and an error estimator for said navigation states.

5. The hybrid navigation device for a vehicle according to claim 4, wherein the error estimator for the navigation states comprises the covariance matrix of the navigation states or a part of the covariance matrix of the navigation states.

6. The hybrid navigation device for a vehicle according to claim 1, wherein the device comprises two hybrid inertial systems (INH1, INH2) and wherein the weighted hybrid signal (DATAOPT) is calculated as a function of said hybrid signals (DATA1, DATA2) and of the respective weighting coefficients of each hybrid navigation system (INH1, INH2), according to the following formula:

$$DATAOPT = \frac{\Lambda_{DATA1} DATA1 + \Lambda_{DATA2} DATA2}{\Lambda_{DATA1} + \Lambda_{DATA2}}$$

where the weighting coefficients $\Lambda_{DATA1}$ and $\Lambda_{DATA2}$ are respectively calculated as a function of the likelihood of the residue between said auxiliary signal and said hybrid signal (DATA1, DATA2) relating to each hybrid inertial system (INH1, INH2).

7. The hybrid navigation device for a vehicle according to claim 6, wherein the error covariance SOPT of the weighted hybrid signal DATAOPT is obtained by the following formula:

$$SOPT = \frac{(\Lambda_{DATA1})^2 SDATA1 + (\Lambda_{DATA2})^2 SDATA2}{(\Lambda_{DATA1} + \Lambda_{DATA2})^2}.$$

8. The hybrid navigation device for a vehicle according to claim 1, wherein said calculation blocks (Calc-V1, Calc-V2) are integrated in the calculator(s) (CAL-H1, CALC-H2) of one or a plurality of hybrid inertial systems (INH1, INH2).

9. The hybrid navigation device for a vehicle according to claim 1, comprising a plurality of hybrid inertial systems (INH1, INH2) and a plurality of auxiliary sensors, wherein each inertial system is hybridized with a different auxiliary sensor.

10. The hybrid navigation device according to claim 1, wherein the weighting module is configured in such a manner to deduce, from the auxiliary signal and the hybrid signals, at least one indicator of good operating condition.

11. A method of navigation for a vehicle comprising:
    acquiring by at least one auxiliary sensor (DET1) at least one auxiliary signal representative of a navigation parameter of the vehicle, and
    acquiring a plurality of signals representative, respectively, of an inertial measurement, by means of a plurality of hybrid navigation systems (INH1, INH2),
    calculating a hybrid signal at the output of each hybrid navigation system (DATA1, DATA2) based on at least one auxiliary signal and a signal representative of an inertial measurement,
    calculating, for each hybrid navigation system, a likelihood of a residue between said hybrid signal output from the concerned hybrid navigation system and said auxiliary signal using a variance estimate of said hybrid signal and a variance estimate of the auxiliary signal,
    calculating a weighting coefficient for each hybrid navigation system (INH1, INH2) as a function of the likelihood of the residue calculated for the concerned hybrid navigation system, and
    calculating a weighted hybrid signal (DATAOPT) as a function of said hybrid signals (DATA1, DATA2) and of the weighting coefficients of each hybrid navigation system, respectively.

12. The navigation method according to claim 11, comprising calculating an indicator of good operating condition as a function of the auxiliary signal and the hybrid signals.

* * * * *